US010104864B2

(12) United States Patent
Murray

(10) Patent No.: US 10,104,864 B2
(45) Date of Patent: Oct. 23, 2018

(54) METHOD OF CONVERTING A VEHICLE FOR UPLOADING, OFFLOADING AND TRANSPORTING A PET

(71) Applicant: Alan Murray, Brookings, OR (US)

(72) Inventor: Alan Murray, Brookings, OR (US)

(*) Notice: Subject to any disclaimer, the term of this patent is extended or adjusted under 35 U.S.C. 154(b) by 0 days.

(21) Appl. No.: 15/655,053

(22) Filed: Jul. 20, 2017

(65) Prior Publication Data

US 2018/0228121 A1 Aug. 16, 2018

Related U.S. Application Data

(63) Continuation of application No. 15/433,765, filed on Feb. 15, 2017.

(51) Int. Cl.
| A01K 1/00 | (2006.01) |
| A47B 88/40 | (2017.01) |
| A47B 81/00 | (2006.01) |
| B60R 3/02 | (2006.01) |
| A01K 29/00 | (2006.01) |

(52) U.S. Cl.
CPC ............ *A01K 1/0035* (2013.01); *A01K 29/00* (2013.01); *A47B 81/00* (2013.01); *A47B 88/40* (2017.01); *B60R 3/02* (2013.01)

(58) Field of Classification Search
CPC .... A01K 1/0035; A01K 29/00; A01K 1/0272; A01K 1/0245; B60P 3/04; B61D 1/163; B60R 3/02
See application file for complete search history.

(56) References Cited

U.S. PATENT DOCUMENTS

| 2,897,781 | A | * | 8/1959 | Olson | A01K 1/0272 |
| | | | | | 119/496 |
| 3,756,622 | A | * | 9/1973 | Pyle | B60R 3/02 |
| | | | | | 280/166 |
| 3,763,827 | A | * | 10/1973 | Burkart | B60P 3/04 |
| | | | | | 119/848 |
| 3,797,461 | A | * | 3/1974 | Breeden | A01K 1/033 |
| | | | | | 119/28.5 |
| 4,546,728 | A | * | 10/1985 | May | A01K 1/0245 |
| | | | | | 119/496 |
| 4,566,404 | A | * | 1/1986 | Instone | A01K 1/0035 |
| | | | | | 119/400 |
| 4,724,925 | A | | 2/1988 | Ritten | |
| 4,803,951 | A | | 2/1989 | Davis | |
| 4,846,304 | A | | 7/1989 | Rasmussen | |
| 4,906,038 | A | * | 3/1990 | Morris | B60P 3/42 |
| | | | | | 296/14 |
| 5,154,125 | A | * | 10/1992 | Renner | B61D 23/02 |
| | | | | | 105/349 |
| 5,205,603 | A | | 4/1993 | Burdette | |

(Continued)

FOREIGN PATENT DOCUMENTS

FR  2826617 A3 * 1/2003
FR  2842773 A1 * 1/2004

(Continued)

*Primary Examiner* — Magdalena Topolski

(74) *Attorney, Agent, or Firm* — Fulwider Patton LLP

(57) ABSTRACT

A method including mounting a horizontal frame in the back bay of a vehicle and slidably extending sections of a collapsible ramp from the frame to the lower distal end to the ground for access by a pet to be loaded into the bay.

14 Claims, 10 Drawing Sheets

(56) References Cited

U.S. PATENT DOCUMENTS

| | | | |
|---|---|---|---|
| 5,228,707 A * | 7/1993 | Yoder | B60R 3/02 |
| | | | 182/127 |
| 5,599,188 A | 2/1997 | Lemos Melendez | |
| 6,267,082 B1 * | 7/2001 | Naragon | A01K 29/00 |
| | | | 119/849 |
| 6,715,177 B1 | 4/2004 | Lagergren-Julander et al. | |
| 6,983,496 B1 | 1/2006 | Hernandez et al. | |
| 7,083,219 B1 | 8/2006 | Gregory | |
| 7,185,381 B1 | 3/2007 | Heartsill et al. | |
| 7,302,725 B2 | 12/2007 | Thygesen | |
| 7,488,025 B1 | 2/2009 | Roberson | |
| 7,549,692 B2 | 6/2009 | Washington | |
| 7,913,651 B1 | 3/2011 | Schiebout | |
| 8,091,294 B2 | 1/2012 | Whalen | |
| 8,246,063 B1 * | 8/2012 | Rowland | B60R 3/02 |
| | | | 280/163 |
| 8,312,846 B1 | 11/2012 | Murray | |
| 8,899,188 B1 | 12/2014 | Douglas et al. | |
| 9,073,475 B2 | 7/2015 | Chastain, Jr. | |
| 9,380,760 B2 * | 7/2016 | Rorke | A01K 1/035 |
| 2003/0007854 A1 * | 1/2003 | Bonsall | B60P 3/04 |
| | | | 414/537 |
| 2005/0166862 A1 * | 8/2005 | Sanford | A01K 1/0272 |
| | | | 119/498 |
| 2007/0158968 A1 | 7/2007 | Chandler et al. | |
| 2008/0042464 A1 * | 2/2008 | Hutchins, Jr. | B60P 1/435 |
| | | | 296/61 |
| 2008/0122238 A1 * | 5/2008 | Fulmer | B60P 3/04 |
| | | | 296/24.31 |
| 2008/0173627 A1 | 7/2008 | Martin et al. | |
| 2009/0038558 A1 * | 2/2009 | Schulte | B60P 3/04 |
| | | | 119/496 |
| 2014/0119863 A1 * | 5/2014 | Hill | B60P 1/43 |
| | | | 414/537 |
| 2014/0239609 A1 * | 8/2014 | Robertson | B60R 3/02 |
| | | | 280/166 |
| 2015/0013614 A1 | 1/2015 | Salzmann | |
| 2015/0232052 A1 | 8/2015 | Link et al. | |
| 2015/0264888 A1 | 9/2015 | Jones et al. | |
| 2018/0105091 A1 * | 4/2018 | Stevens | B60P 1/431 |

FOREIGN PATENT DOCUMENTS

| | | | |
|---|---|---|---|
| GB | 747815 A * | 4/1956 | B60P 3/04 |
| GB | 1369916 A * | 10/1974 | |

* cited by examiner

METHOD OF CONVERTING A VEHICLE FOR UPLOADING, OFFLOADING AND TRANSPORTING A PET

CROSS-REFERENCES TO RELATED APPLICATIONS

This application is a continuation of U.S. Utility patent application Ser. No. 15/433,765, filed Feb. 15, 2017, incorporated by reference in its entirety.

FIELD OF THE INVENTION

The invention relates to pet cages for housing pets while traveling in vehicles.

BACKGROUND OF THE INVENTION

In the United States alone there are some 46 million households with pets, and of those, 65% are larger breed dogs. The overall market for pets is $50 billion per year, and about 50% of that is dog owners. Pet owners and pets alike prefer each others' companionship, even when traveling by vehicle.

Pets, particularly dogs, are always ready for a ride in an SUV, crossover or other vehicle having some degree of interior space.

The rear door of a SUV or a crossover typically opens to an elevated floor, thus requiring the pet to leap up or be lifter up onto the floor of the rear bay. This serves well for younger dogs but as they grow older and joints deteriorate, the leap is highly challenging or totally impossible. Furthermore, in this arrangement the pet occupies practically the entire length and width of the bay, thus leaving no space available for other utility, such as storage of groceries, sporting goods, hunting equipment and dog paraphernalia.

Even then, the dog requires restraint, thus leading to the owners utilizing wire or rope barriers or the like partitioning the front and rear of the vehicle. This still leaves the rear of the vehicle totally dedicated to the pet, without space for other cargo.

The problem with loading dogs, and particularly larger dogs, into the vehicle often involves the purchase of a generic ladder or the like, which might be foldable or collapsible to be stored in the back seat and deployed at the loading spot. To make the load, the driver removes the ladder from the back seat and unfolds the sections to lean the top end against the bumper or rear of the vehicle to hopefully allow the dog to climb up the ladder without falling to the right or left or destabilizing the ladder. The problem is exacerbated in foul weather when the ladder ramp may be exposed to the elements and the bottom end submerged in mud or water, often resulting in unequal loading and risk and fright to the animal as he or she seeks to climb the ramp.

It has long been known that there is a critical need for lift and ramp devices for older dogs. There are several reasons why this need has grown over the years.

First, older pets are not viewed as expendable, and owners of those with mobility limitations often seek various devices to maximize the quality and length of life for both the animal and owner, such as detachable wheels that may be strapped to the animal to provide mechanical means of independent movement or lightweight portable lift devices, such as hoists and the like. One significant challenge is that animals often tend to resist, particularly in inclement conditions, walking up a ramp where their paws might slip or be unstable. They may have a tendency to pull away from the owner or leave the ramp partway up, thus leading to injury and challenges for reorganizing the animal and getting them back on board.

These issues have been addressed in the past, including the proposal of a deployable ramp with opaque sidewalls to confine the animal ascending the ramp to avoid a sense of elevation which might disturb some animals. A device of this type is shown in U.S. Pat. No. 8,899,188 to Douglas. This loading method, while helpful for distracting animals from fear of height, involve cumbersome ramps which are inconvenient to use, and require some degree of skill and strength to store and deploy.

Other efforts have led to the proposal that a ramp that can be hinged to the rear of a vehicle and articulated so that it can be folded out for access by the animal. A device of this type is shown in U.S. Pat. No. 6,715,177 to Lagergren-Julander. Use of such devices again suffers the shortcoming that the user must fold the ramp to store it in the back seat or back bay of the vehicle and to be pulled out and unfolded each time of use to be somehow releasably attached to the vehicle itself.

It is also recognized that there can be benefits to containing the pet within the confines of an enclosure to be installed in a vehicle. That is, it has been proposed to provide a collapsible framework with mesh or the like to thus provide a separate housing with the vehicle. A device of this type is shown to U.S. Pat. No. 4,803,951 to Davis. Such devices, while serving to provide some containment for the animal, are inconvenient to use and cannot accommodate other components, such as ramps, stairways or storage drawers.

It has been known that pets find it uncomfortable to lie, sleep or sit in the bay of a vehicle with planer floors and perpendicular sidewalls. To address this problem, it has been proposed to provide peripheral cushions around the edge of the bay or the like to cushion the pet. Devices of this type are shown in U.S. Patent Publication No. 2008/0173627 to Martin, published Jul. 24, 2008. This approach, while affording some comfort, fails to provide comfort within the confines of a cage or provide contoured shape complementing the shape of a pet's body when resting.

In my U.S. Pat. No. 8,312,846, I propose a method of telescoping sections of a ramp from a cage in the back bay of a vehicle. While enjoying some success, that method had only limited horizontal reach.

It has been proposed to construct a detached folding pet staircase having horizontal treads carried from a parallelogramatic frame to be deployed from a stacked configuration to an inclined position. A device of this type is shown in U.S. Pat. No. 8,091,294 to Whalen. The shortcoming of a method using this device is that the frames tend to end up with loose joints, allowing the steps to wobble, thus frightening the animal.

In unrelated art it has been suggested that a pivotal ramp might be attached to a child's crib to assist in ingress and egress. This method is disclosed in U.S. Pat. No. 6,893,496 to Hernandez. While practical for a child's crib, such a method still fails to provide the desired reach for convenient loading and unloading of pets.

Ladders have been proposed for loading swimmers over the rearwardly and downwardly sloped transom of a sailboat, but such devices have little practicality for loading pets into a SUV or the like.

SUMMARY OF THE INVENTION

The present invention involves a method of converting the back bay of an SUV or the like to a pet loading and cage apparatus, leaving portions of the bay available for functions other than transporting a pet. The method involves a telescopical ramp or stairway collapsed into a horizontal landing device slidable from a frame to a deployed, extended position for sliding of the ramp/ladder distally to an extended position. In some aspects, the invention includes fencing on one or more sides of the frame to limit the extent to which the pet might roam about the interior of the bay or accessing the seats forward in the vehicle.

The features and advantages of the invention will be more readily understood from the following detailed description which should be read in conjunction with the accompanying drawings.

DETAILED DESCRIPTION OF THE PREFERRED EMBODIMENTS

Figure 3:
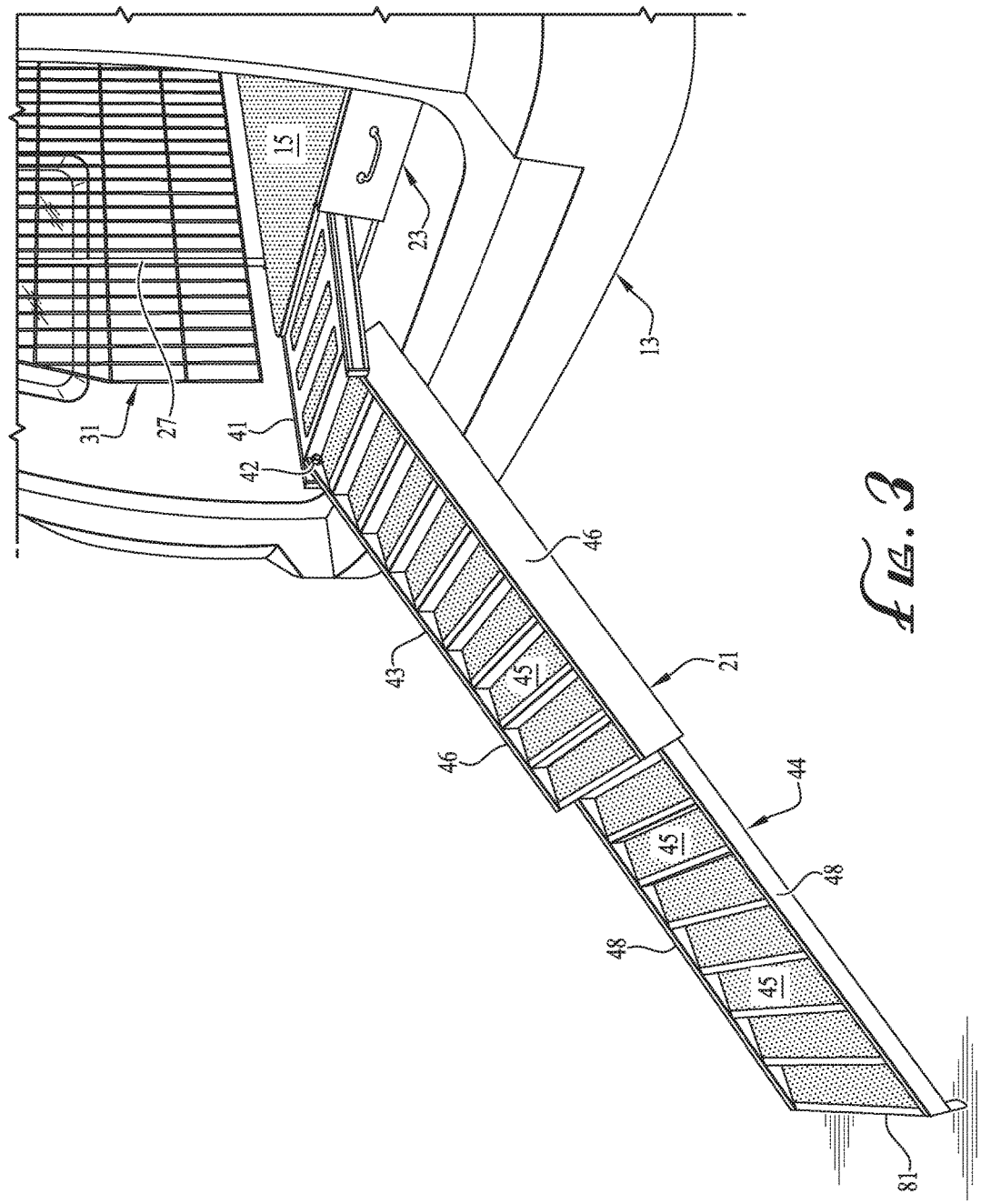
FIG. 3 is a rear perspective view of the vehicle shown in FIG. 1, in reduced scale, with the stairway deployed.
Figure 5:
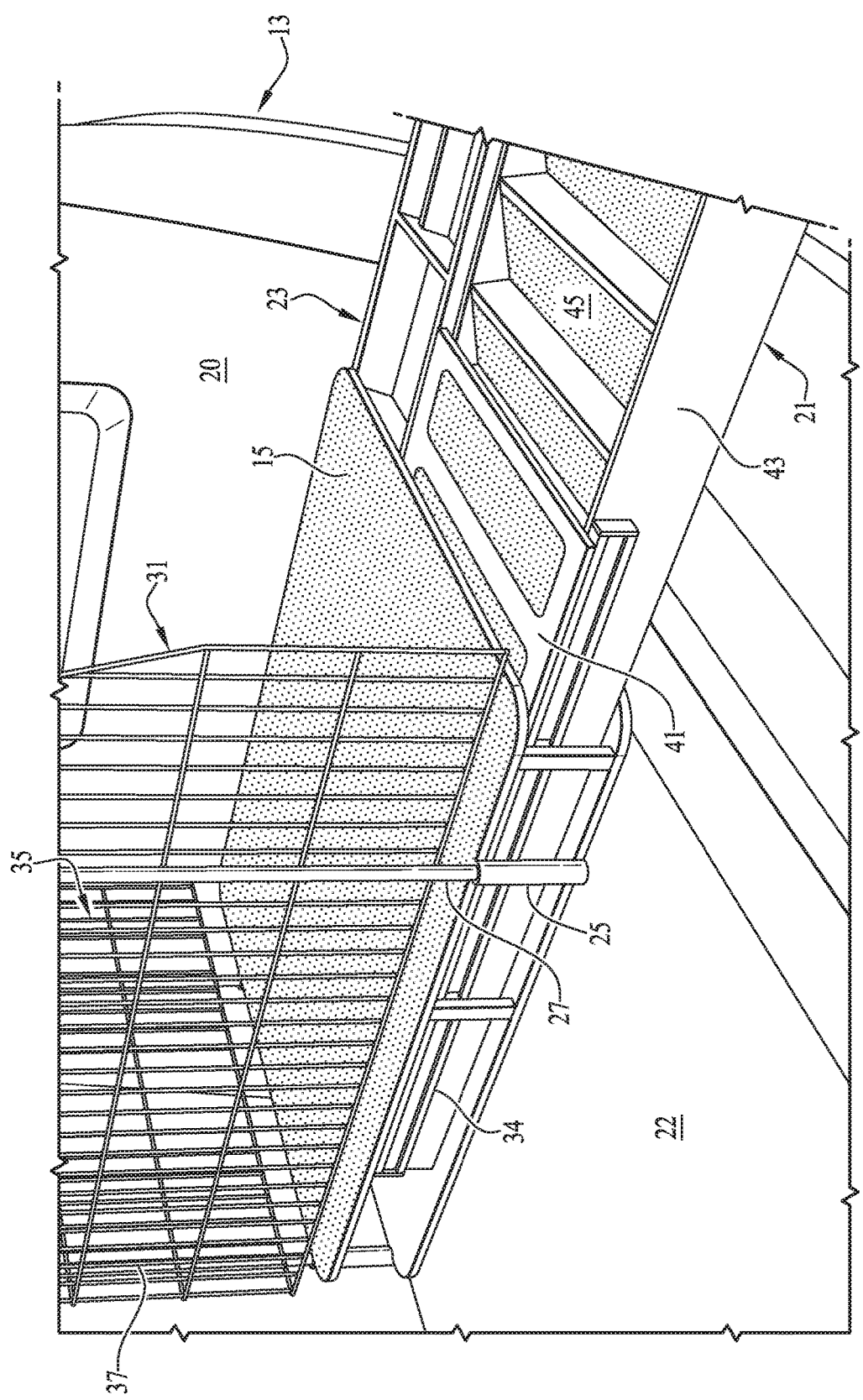
FIG. 5 is a rear perspective view of the vehicle shown in FIG. 1 depicting the stairway apparatus.
Figure 6:
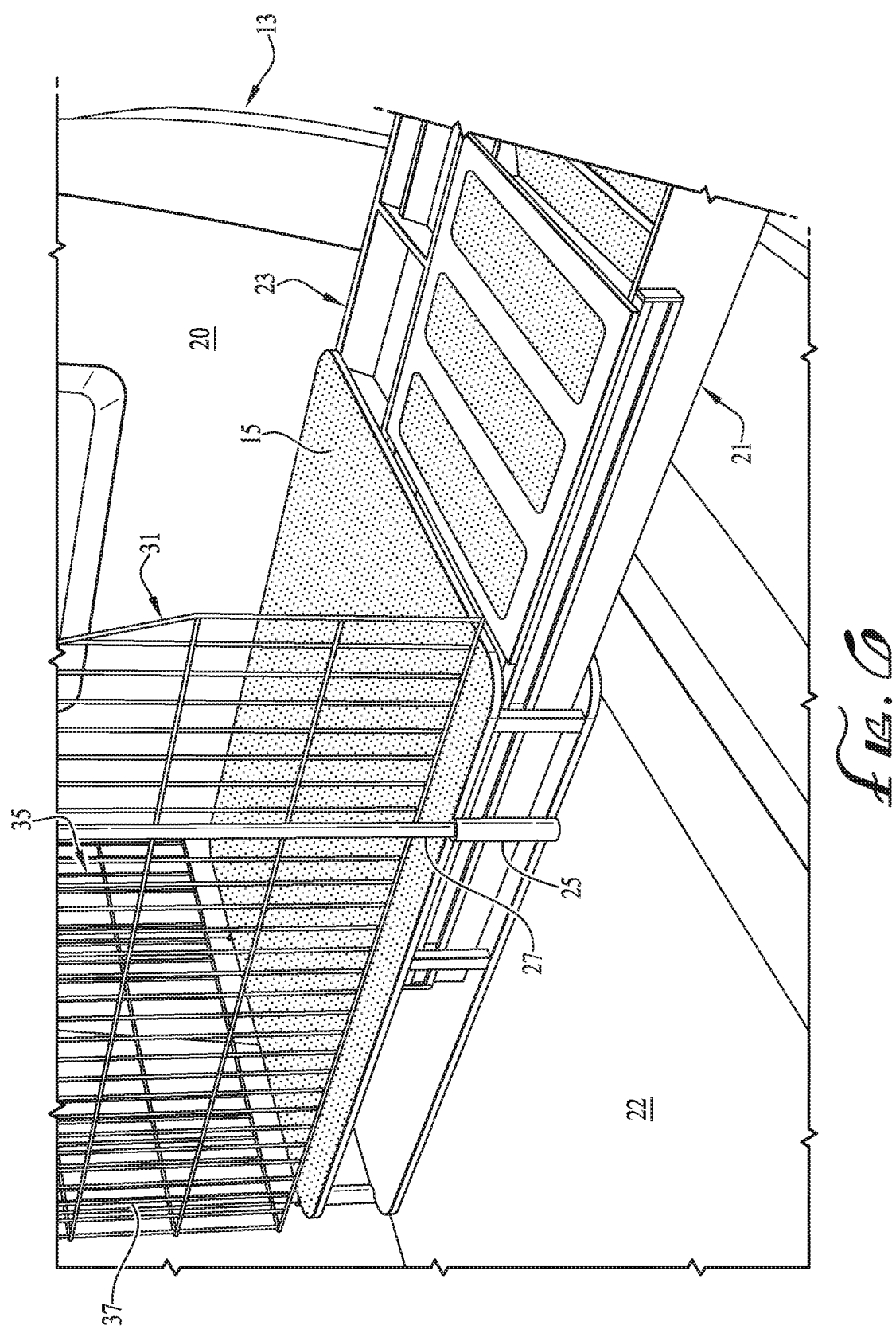
FIG. 6 is a detail view similar to FIG. 5, but showing the stairway more deployed.
Figure 7:
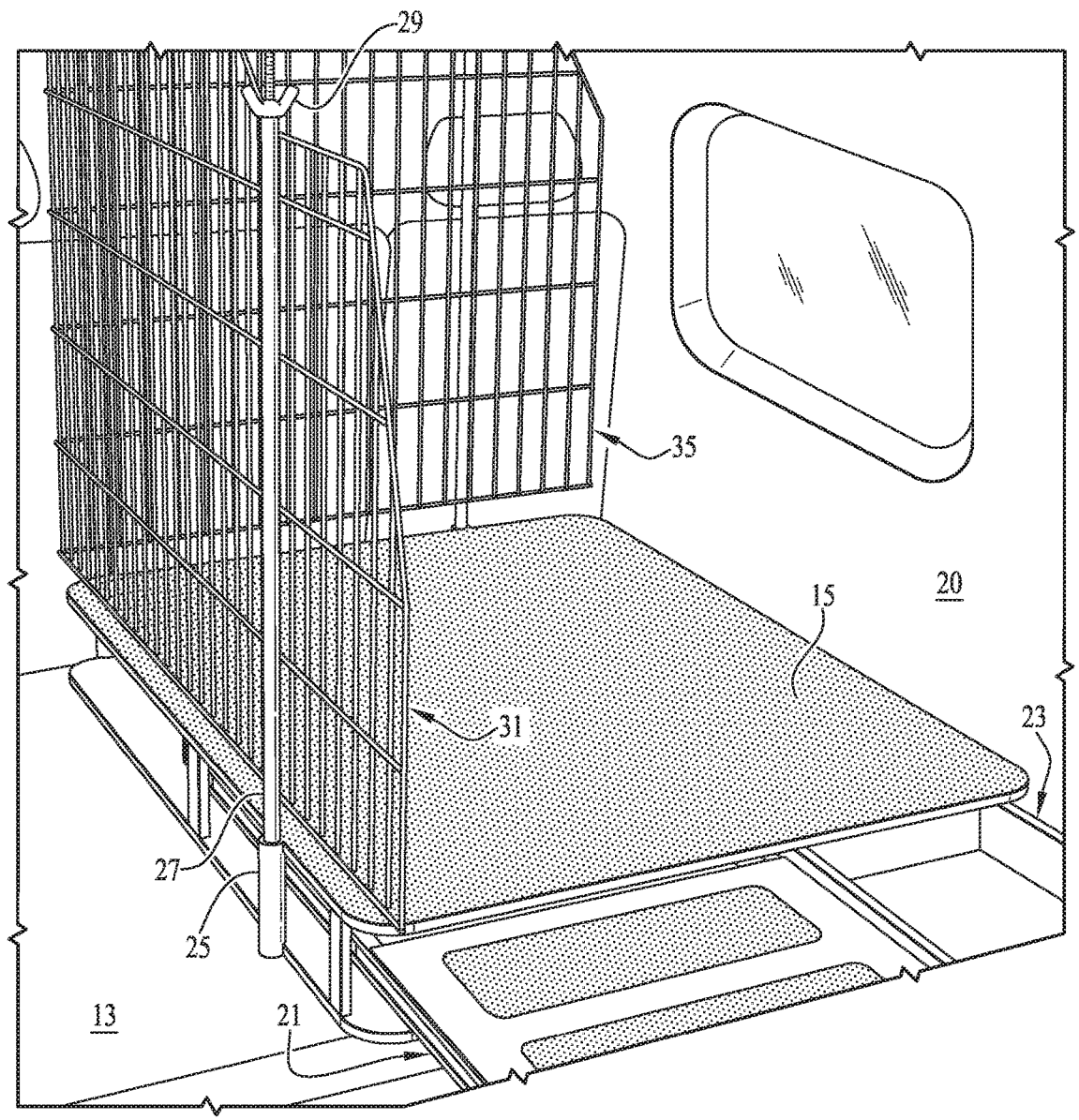
FIG. 7 is a rear perspective view of the pet cage and stairway apparatus shown in FIG. 1.
Figure 8:
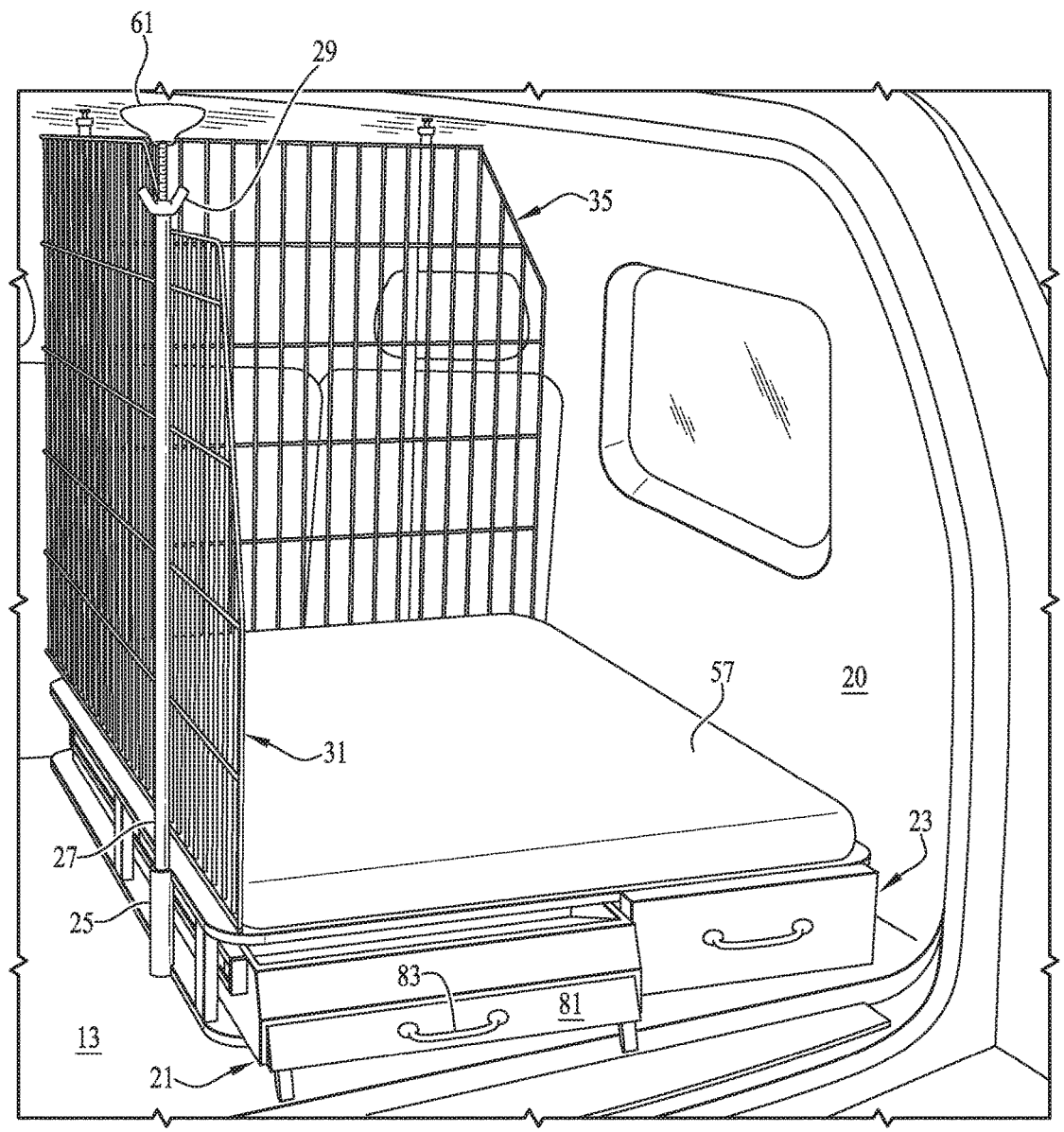
FIG. 8 is a rear perspective view similar to FIG. 7 but showing a cushion on the bottom frame of the apparatus of the present invention.

Referring now in more detail to the exemplary drawings for purposes of illustrating embodiments of the invention, wherein like reference numerals designate corresponding or like elements among the several views, In one aspect, the method of the present invention is intended for loading and transporting a pet in the rear bay of a vehicle, such as a crossover or SUV 13 having a doorway 100. In one embodiment my method employs a device having a bottom horizontal frame, including bottom and top walls 14 and 15, respectively, spaced apart and including a central divider to form flanking, rearward opening first and second tunnels 17 and 19 for receipt of rearwardly slidable landing device 41 carrying a ramp or stairway device 21 and drawer 23, respectively. For the purpose of illustration, I show my stairway device 21 as being made of rigid sections to be telescopically extendable from the tunnel 15 via the rearwardly slidable, cantilevered, horizontal landing device 41 to be deployed rearwardly therefrom. The stairway device includes female stairway section 43 to be carried horizontally with the carrier for slidable extension therefrom to be pivoted down about transverse bolts 42 carried from sliders in the confronting sides of the platform tracks 34 (FIGS. 3 and 5). An extendable lower male stairway section 44 is telescopically carried by the section 43. Preferably, the stairway sections 43 and 44 include steps spaced therealong and formed with respective tread surfaces 45 disposed in horizontal planes when the stairway device is deployed as shown in FIG. 3. Preferably, the device includes an upstanding front fence 35 and side fence 37, which act to partition from the forward seats and to divide the width of the bay into approximately one-half the overall lateral span thereof.

Utility vehicles, such as crossovers and SUVs, have become highly popular with pet owners due to the convenience of use and space provided. These vehicles are typically formed with a planer floor and vertical outboard walls 20 and a rearwardly opening doorway 100, which might be on the order of five feet wide, thus leaving generous space for access from the rear. It is common practice for pet owners to thus place their pets in the rear bay, occupying the entire width thereof, thus depriving the owner of that space for storage of paraphernalia and items to be transported, such as groceries, shotguns, duck decoys, and other items which cannot safely be comingled with the pet.

Thus, in one aspect of the present invention, I provide my pet cage of a width which will leave a flanking portion of the bay separated from the pet, as, for instance, a quarter to one-half or as much as three-quarters of the entire width, to reserve the remaining space for carrying other cargo, such as groceries or the like.

I construct my horizontal frame with the horizontal walls 14 and 15 spaced vertically apart a distance of, say, four or five inches to thereby provide a height for my tunnels 17 and 19 adequate to receive a robust stairway device and drawer.

In the preferred embodiment, I provide a framework, including vertical spaced apart stub posts 30 supporting the top wall 15, which acts as a false bottom for the pet compartment. In some embodiments, I cover the wall 15 with a covering, which may be plastic, rubber or other durable covering.

As shown in FIG. 3, the landing device 41 is so constructed that, when fully extended, the back end of thereof overhangs the back bumper in cantilever fashion to dispose the pivot bolts 42 in the vertical plane of the vehicle back bumper to position the downwardly inclined telescopically deployed stairway sections clear of such bumper.

Figure 1:
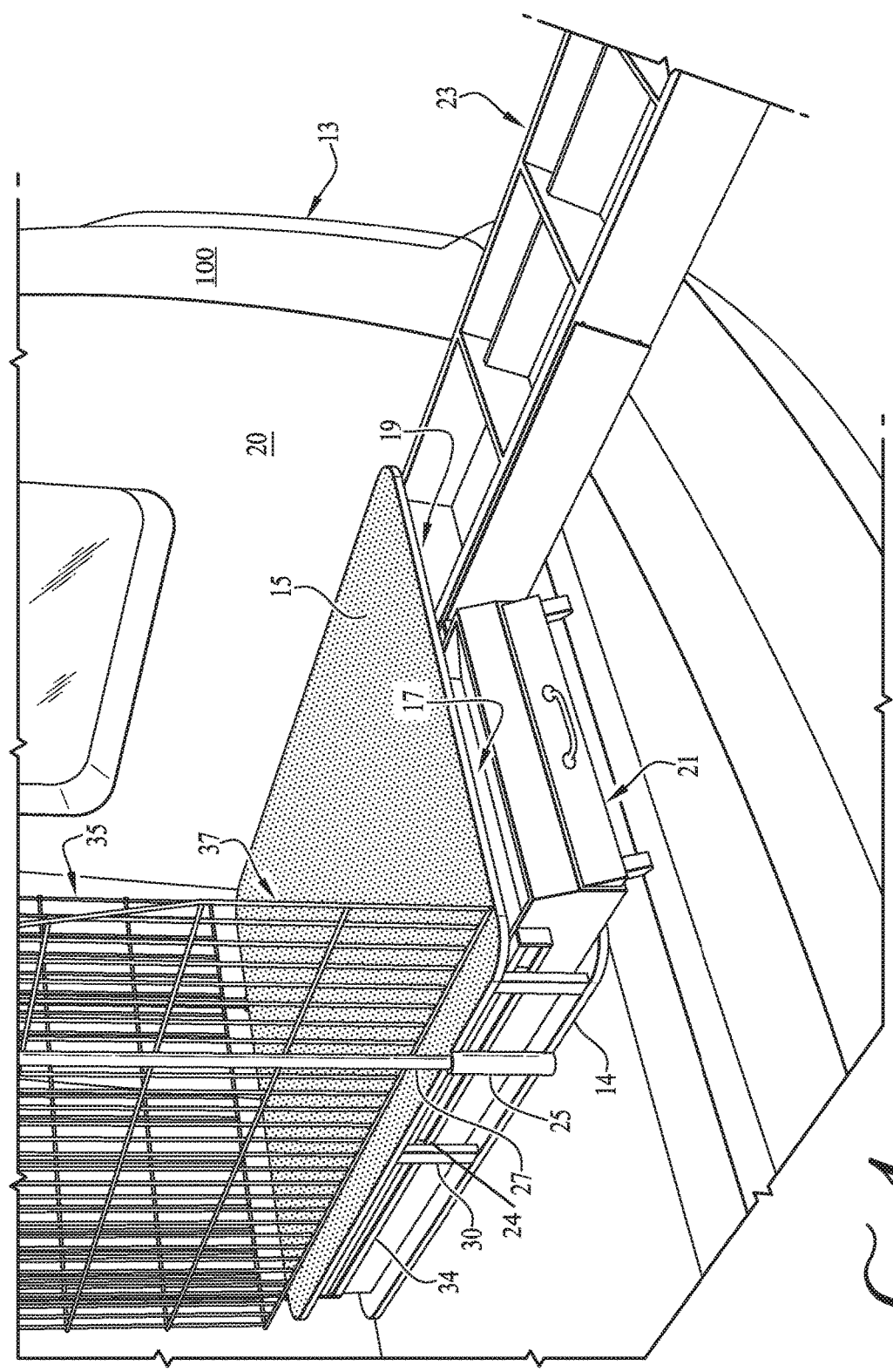
FIG. 1 is a perspective view showing the rear bay of a vehicle receiving a pet cage and stairway device utilized in the method of the present invention.
Figure 2:
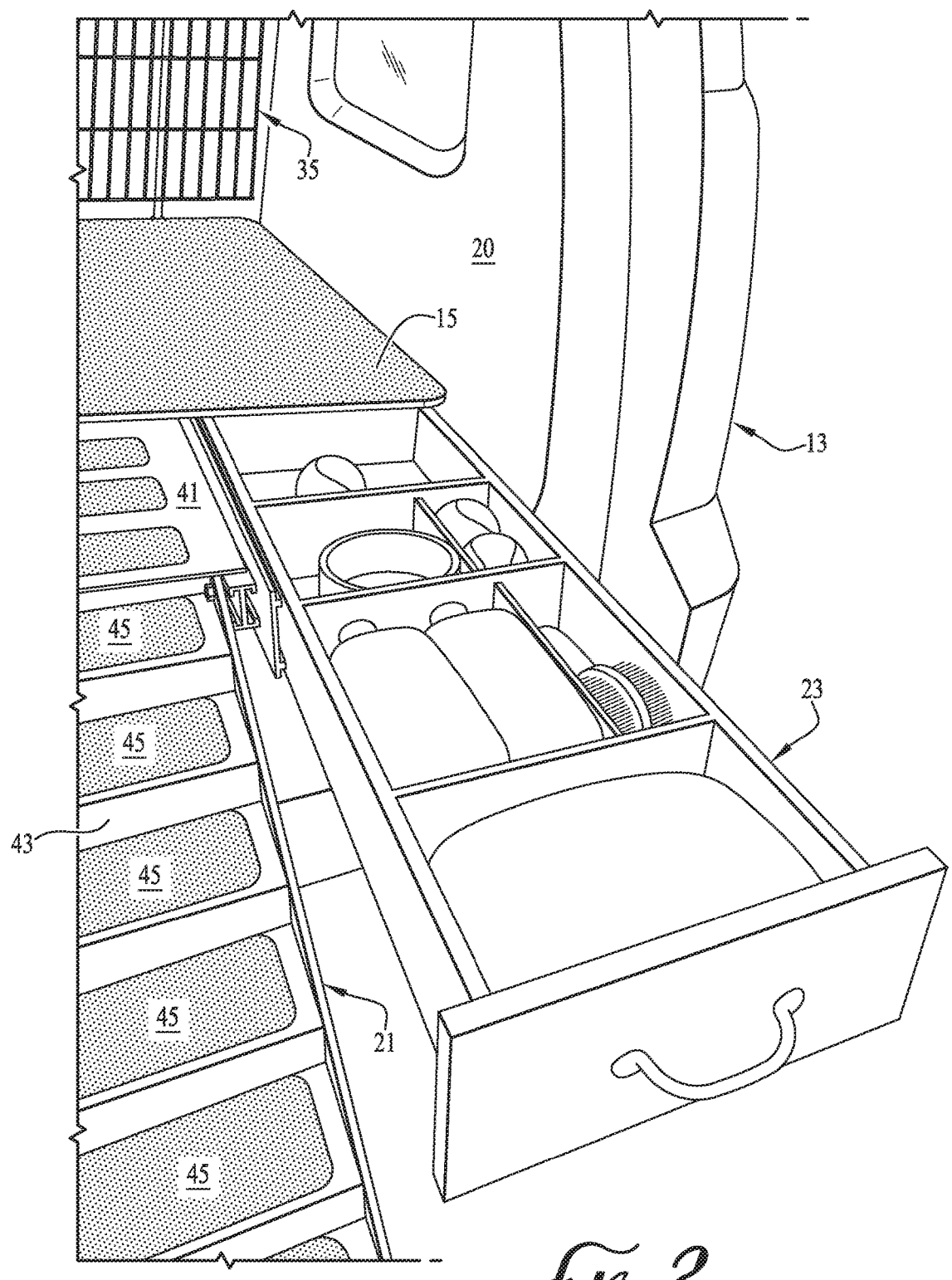
FIG. 2 is a perspective view of the right hand side of the cage shown in FIG. 1.

Mounted at the top of the frame, from the opposite sides of the tunnel 17 are channel-shaped rails defining oppositely opening double sided, horizontal channels defining tracks 34 to accommodate horizontal sliding of the landing device 41 relative to the bottom frame to carry the underslung ladder device. The upper end of stairway section 43 may then be slid rearwardly relative to such landing device so the landing device may support the upper ladder section 43 slung therebelow and supported therefrom in cantilever fashion. To this end wheels or sliders 24 (FIG. 1) may mounted to the opposite sides of landing device 41 to engage the respective tracks 34 and, similarly sliders or wheels mounted to the opposite sides of the platform to engage the inner track. For the purposes of this disclosure, the term slider is intended to include a classic slider constructed of plastic or Teflon or the like, or a rotatable wheel to cooperate in carrying the weight of the platform and ladder in the departure channels.

Figure 4:
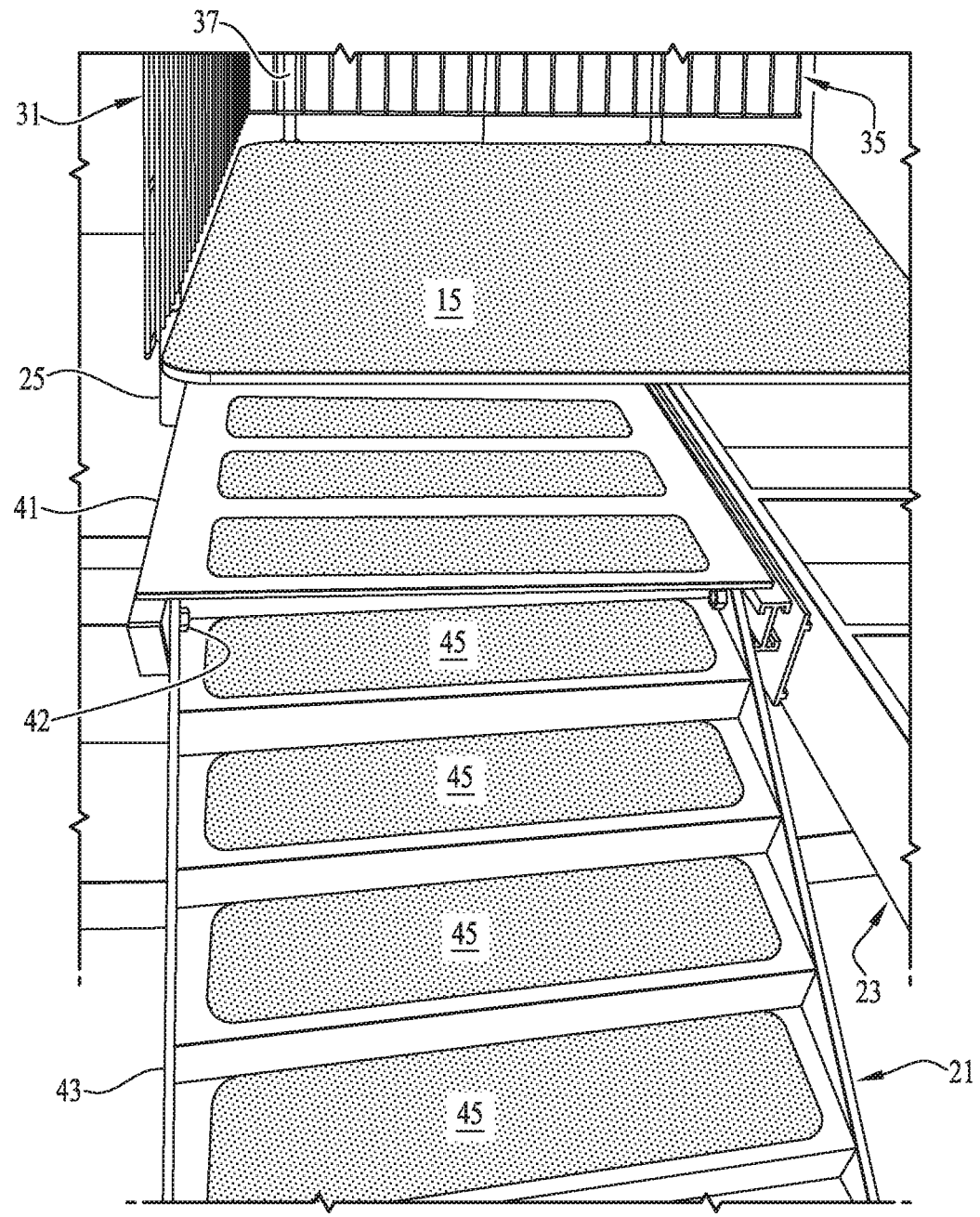
FIG. 4 is a rear perspective view of the vehicle shown in FIG. 1 with the stairway deployed.

To that end the upper female stairway section 43 is configured with side walls 46 which are carried pivotally on their upper extremities from tracks 20 defined by the rails 34. The pivot bolts 42 (FIG. 4) in combination with the rails 34 provide for pivoting and sliding. Formed on the interior surfaces of the side walls are respective inwardly opening longitudinal tracks which receive the side rails 48 of the male lower section 44 to accommodate sliding longitudinally to telescope the lower section into the upper section The walls 46 are formed with longitudinal center lines. Mounted on their confronting sides, above the respective centerlines are the opposite ends of steps 45, and mounted below such centerlines are side tracks receiving the opposite rails 48 of the lower ladder section 44 for sliding thereof under the plane of the steps 45 of the upper section.

The front and side fences 35 and 37 are preferably constructed of heavy gauge wire or thin rods to form a gridwork to be self-supporting or supported from vertical posts 27 carried in upwardly opening cylindrical receivers 25 mounted to the sides and front end of the bottom frame.

Figure 10:
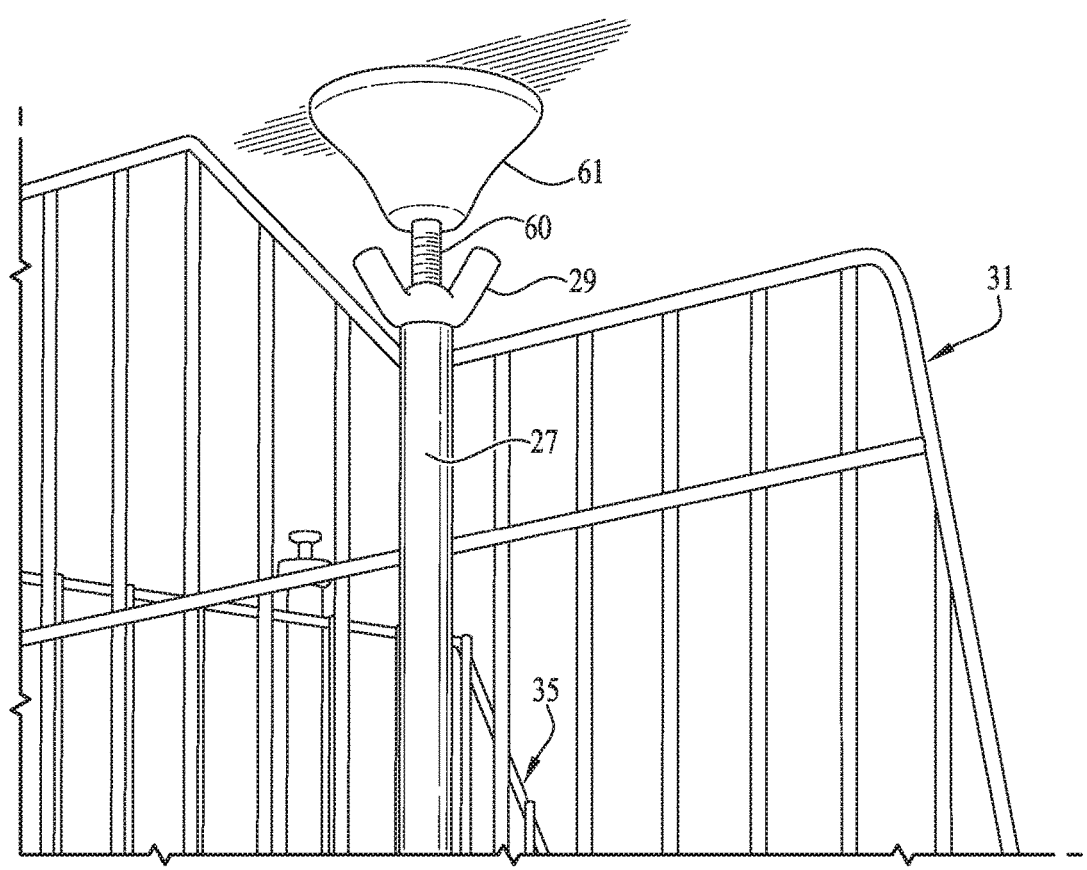
FIG. 10 is a perspective view, in enlarged scale, of a post incorporated in a fence included in the apparatus shown in FIG. 1.

In some embodiments, I incorporate a holding device for compressing between the frame and the vehicle overhead to cooperate in holding the respective fences in place. Referring to FIG. 10, for the purposes of illustration, I show a threaded rod 60 mounting a pressure plate 61 on the upper extremity thereof and driven upwardly and downwardly within the top of the open post 27 by means of a wing nut 29 so that once the fences are in place, wing nut 29 may be rotated to drive the pressure plates against the upholstery on the roof of the vehicle.

In one preferred embodiment, I incorporate a mattress 57 configured to the exact dimensions of the false bottom defined by the wall 15 to cover such false bottom in its entirety. In this embodiment, I incorporate an impervious cover for covering the cushioning mattress for the pet's comfort and to receive hair, grease and debris from the pet and which can be easily removed and washed by a hose or the like.

In some embodiments, I incorporate contoured cushions 51 and 53 (FIG. 9) along the respective fences 31 and 35 to fit the contour of a dog lying on the mattress covering such cushions. The cushions are formed with perpendicular bottom and back sides, as well as a marginal top surface 50, and then curves downwardly and inwardly to form a concave inwardly opening nest 52.

It will be appreciated that the drawer 23 may come in numerous different configurations and incorporate various compartments for different paraphernalia. For the purpose of illustration, I show the drawer as being customized for pet toys, water, grooming tools, cushions and the like to facilitate the organization and storage thereof and provide for ready access when needed.

In operation, it will be appreciated by those skilled in the art that the method of the present invention is economical to practice and convenient to perform. The method may employ several different components, sold separately and acquired by the pet owner as the pet matures, grows in size, or the habits of the pet change over time.

Typically, the bottom frame is fabricated and sold with the tunnels 17 and 19, with or without the stairway 21 and/or landing device 41. In practice, my method may involve retrofitting the apparatus into the back bay of an SUV, utility vehicle, truck or pickup.

In any event, the method of the present invention provides a self-contained unit which is easy to install, requiring a minimum of skill and effort. The frame is loaded into the vehicle 13 and for those embodiments constructed for containment, side fences 35 and 31 installed. The fences are erected by positioning them vertically on the respective front and the inboard side of the bottom frame, with the lower ends of the respective posts 27 nested against the bottom walls of the upwardly opening receivers 25 to provide vertical support. In some embodiments, which include the pressure pad 61, the adjustable wing nuts 29 may be rotated to push the pressure pads upwardly into contact with the lining of the roof to trap the posts between the bottom walls of the receivers 25 and the lining for additional security and support, something that may be preferable for larger dogs which might bump against the respective fences when the vehicle either slows or turns a right hand corner.

Figure 9:
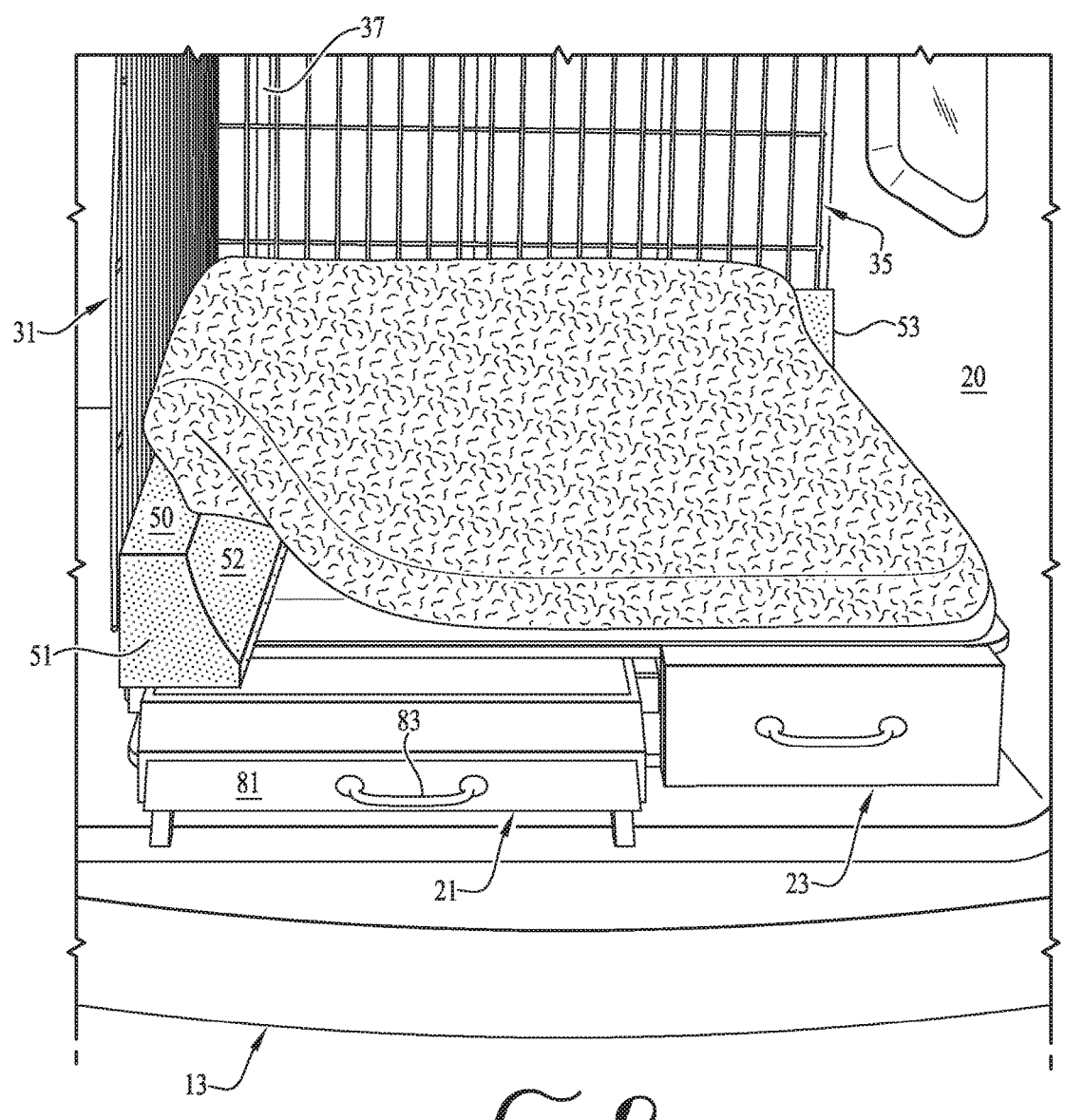
FIG. 9 is a rear perspective view similar to FIG. 8 but showing contour cushions about the periphery of the bottom frame.

For storage, in those embodiments which include a stairway device 21 with the upper stairway section 43 and lower section 44, the bottom end will be raised and the rails 48 (FIG. 3) of the lower section slid forwardly on the tracks in the upper section 43. The top end of the upper section 43 will be slid forwardly on the rails 34 of the landing device 41 and the landing device slid forwardly in the frame thereby creating a relatively neat and attractive closed configuration as depicted in FIG. 9. In some embodiments, the lower free end 81 of the lower stairway section 44 includes a face plate 81 mounting a handle 83 for convenience of shifting. The lower stairway section 44 may also mount on its lower extremity a brace or foot 66 (FIG. 3) which may be pivoted downwardly when deployed to serve as a support for the lower end of such section 44 to maintain the bottom end elevated from the supporting surface.

Likewise, either upon initial purchase or as an add-on later, a drawer 23 may be acquired to fit within the associated tunnel to provide for convenient storage and easy access.

It will be appreciated that the owner may elect to purchase the contoured cushions 51 and 53 to be disposed in close fit relationship along the respective side and front of the cage defined by the fences 31 and 35, respectively. The mattress 57 may then be positioned on the upper wall 15 and folded upwardly onto the respective contoured cushions 51 and 53 as shown in FIG. 9.

When the owner elects to take the pet on an outing, he or she may open the back door of the vehicle 13 for access to the interior of the cage. For a younger and nimble pet, the pet may readily spring upwardly into the interior of the cage without the assistance of a ramp, stairway or ladder. Then, by closing the rear door, the pet will be confined to the interior of the cage and will be blocked from leaping forward over into the passenger seats or intruding on the inboard side of the cage, thus leaving the storage space 20 open and accessible for storage of groceries and the like during transport.

For older or larger dogs, the owner will want to have the benefit of the stairway and can easily deploy the stairway for loading and unloading of the pet. This may be achieved by, when the rear door of the vehicle is open as in FIG. 9, grasping the handle 83 and easily and effortlessly drawing the landing device 41 rearwardly to a cantilevered, horizontal position, and drawing the upper and lower stairway sections rearwardly to telescope them apart to the deployed position shown in FIG. 3. In my preferred embodiment, the components are so balanced that this deployment may be by one finger. The foot 66 (FIG. 3) at the bottom of the section 44 will provide support from the ground and, in some instances, is formed to elevate the bottom of the stairway to maintain it raised from underlying debris or mud or the like.

With the stairway 21 so deployed, the animal will have ready access to the steps 45 to walk up the stairway sections 44 and 46 at a favorable angle with his or her paws on the horizontal surfaces of the steps 45, thus giving a sense of security and stability as the pet progresses up the sections 44 and 43 to the top tread of the horizontal landing device 41 to enter the cage area from the horizontal landing surface. In this regard, it will be appreciated that the deployed landing device 41 (FIG. 3) presents a horizontal, upwardly facing tread surface having sturdy support and a robust walkway to give the pet a feeling of security as they pass forwardly or rearwardly thereover.

With the pet loaded in the cage, the stairway 21 may be easily raised and the sections 44 and 43 again telescoped together and into the compartment formed under the landing device 41, driving it forwardly into its stored position to be carried forwardly in the vehicle with the platform for convenient and compact storage during the ride. This construction has the advantage of the long reach provided by the ladder sections and landing while providing the compactness of the ladder sections and landing device folding into one another.

From the foregoing, it will be appreciated that the apparatus of the present invention, in its various aspects, provides a convenient, inexpensive and effective means for containing a dog or other pet in a regulated area of a rear bay of a van or the like. The device is convenient to install and provides an organized arrangement for loading, unloading and transport of the dog. The stairway is stored in an organized and convenient fashion with minimal effort without the necessity of wrestling a ramp or ladder around and accessing the backseat for storage during travel, or hooking over the rear of the vehicle for loading and risking the attendant instability during loading or unloading of the pet.

The invention may be embodied in other forms without departure from the spirit and essential characteristics thereof. The embodiments described therefore are to be considered in all respects as illustrative and not restrictive. Although the present invention has been described in terms of certain preferred embodiments, other embodiments that are apparent to those of ordinary skill in the art are also within the scope of the invention. Accordingly, the scope of the invention is intended to be defined only by reference to the appended claims.

I claim:

1. A method of preparing to load and transport a pet in a rear bay of a vehicle having a door for opening to expose a doorway and including:
   selecting a cage mounted on a horizontal frame having a floor with an upwardly facing bed and formed under the bed with an outwardly opening tunnel; the cage consisting of two vertical fences erected around two sides of the frame;
   selecting an extendable ramp device with a plurality of ramp sections and a horizontal landing device to be extended from the tunnel to cooperate in creating a walkway from the upwardly facing bed;
   inserting the ramp device in the tunnel for slidable extension to project the landing device to a cantilevered horizontal position; and
   sliding the ramp sections distally from the landing device to an inclined loading position projecting distally and downwardly from the landing device wherein the horizontal frame is loaded in the back bay and the landing device and ramp sections slide outwardly from the tunnel to the inclined position while retaining the frame stationary in the back bay.

2. The method of claim 1 that includes:
   storing pet paraphernalia in a drawer under the bed.

3. The method of claim 1 that includes:
   securing the frame between a floor and ceiling of the vehicle.

4. The method of claim 1 that includes:
   selecting the ramp as a stairway with steps having respective step surfaces disposed, when the ramp is in the loading position, in horizontal planes.

5. The method of claim 1 that includes:
   deploying the landing device to carry the ramp sections clear of the vehicle.

6. The method of claim 1 that includes:
   slidably extending the ramp sections relative to one another.

7. The method of claim 1 that includes:
   selecting the ramp device with male and female sections, the female sections having tracks mounted on opposite sides thereof and the male sections having slides on opposite sides thereof to interact with respective tracks for sliding the female and male sections longitudinally relative to one another.

8. The method of claim 1 that includes:
   selecting the ramp device with a distal end having a handle thereon.

9. The method of claim 1 that includes:
   sliding a drawer from a retracted position in the frame to and extended position.

10. A method of retrofitting a back bay of a vehicle to transport a pet, including:
    selecting a pet cage mounted on a horizontal frame including a floor cooperating in forming a top wall of an outwardly opening tunnel; the cage consisting of two vertical fences;
    placing the horizontal frame and pet cage in the back bay; erecting the two vertical fences around two sides of the frame;
    sliding a landing device in the tunnel;
    selecting a ramp device having extendable rigid ramp sections to be extended slidably from the horizontal frame and relative to each other to slope downwardly and outwardly in a loading position;
    sliding the landing device horizontally from the frame to an extended horizontal position, carrying the ramp device therewith; and
    deploying the rigid ramp sections the to form a rigid stairway disposed in the loading position.

11. The method of claim 10 that includes:
    selecting slides and tracks interposed between the landing device and ramp sections and between the ramp sections.

12. The method of claim 11 that includes:
    selecting the horizontal frame with a pet bed.

13. A method of retrofitting a vehicle rear bay of a predetermined width including:
    selecting a pet cage mounted on a horizontal frame having a width less than three quarters of the predetermined width and including a pair of rearwardly opening tunnels; the pet cage consisting of two vertical fences;
    loading the cage and frame in the rear bay; erecting the two vertical fences around two sides of the frame
    selecting an elongated stairway device with multiple rigid sections carried slidably from a horizontal landing device and with the rigid sections slidable longitudinally, one rigid section relative another, to an extended position sloping downwardly and outwardly and with the rigid sections carrying spaced apart steps with step surfaces disposed in horizontal planes; and
    extending the stairway device from the landing device to the extended position to dispose the step surfaces on the stairway device in the respective horizontal planes.

14. A method of preparing a vehicle having a back bay for transport of a pet and including:
    selecting a horizontal frame for mounting to one side of the bay and configuring the frame with a horizontal wall having an upwardly facing floor surface and including an outwardly opening tunnel below the horizontal wall;

making a pet cage mounted on the frame over the floor surface; the pet cage consisting of two vertical fences; erecting the two vertical fences around two sides of the frame;

making a landing device to be received in the tunnel and slidable outwardly from the tunnel relative to the pet cage to a horizontal, cantilevered loading position and including a horizontal landing surface to be slid outwardly with the landing device;

making a landing device mounting device including landing device tracks and sliders mated together and interposed between the landing device and horizontal frame for sliding of the landing device outwardly to the loading position;

making an elongated ramp device with upper and lower extremities and including upper and lower ramp sections slidable together for extension of the lower ramp section relative to the upper ramp section;

placing the ramp device in the tunnel for sliding from a retracted position to an extended loading position for pivoting of an upper extremity about a pivot axis to angle downwardly and outwardly to a ramp loading position;

making a ramp mounting device including tracks and sliders mated together and interposed between the ramp device and landing device for sliding of the ramp device relative to the landing device wherein the landing device is slid outwardly from the tunnel to the horizontal cantilevered loading position and the ramp device is slid outwardly relative to the landing device and pivoted downwardly about the pivot axis to the ramp loading position.

\* \* \* \* \*